United States Patent [19]

Danzer

[11] Patent Number: 5,291,204
[45] Date of Patent: Mar. 1, 1994

[54] RADAR RESPONSE SYSTEM

[75] Inventor: Paul M. Danzer, Norwalk, Conn.

[73] Assignee: United Technologies Corporation, Hartford, Conn.

[21] Appl. No.: 549,835

[22] Filed: Jul. 9, 1990

[51] Int. Cl.⁵ .............................................. G01S 13/80
[52] U.S. Cl. .......................................... 342/44; 342/50; 342/160
[58] Field of Search .................. 342/42, 51, 44, 160, 342/161, 50, 45

[56] References Cited

U.S. PATENT DOCUMENTS

| | | | |
|---|---|---|---|
| 4,072,946 | 2/1978 | Kneefel | 342/42 |
| 4,278,977 | 7/1981 | Nossen | 342/42 |
| 4,471,344 | 9/1984 | Williams | 340/572 |
| 4,622,557 | 11/1986 | Westerfield | 342/357 |
| 4,679,046 | 7/1987 | Curtis et al. | 342/51 |
| 4,682,173 | 7/1987 | Kotoh et al. | 342/51 |
| 4,694,297 | 9/1987 | Sewards | 342/45 |
| 4,698,633 | 10/1987 | Lamensdorf et al. | 342/42 |
| 4,724,427 | 2/1988 | Carroll | 342/44 X |
| 4,725,841 | 2/1988 | Nysen et al. | 342/44 |
| 4,728,955 | 3/1988 | Hane | 342/140 |
| 4,804,961 | 2/1989 | Hane | 342/125 |
| 4,864,306 | 9/1989 | Witta | 342/42 |
| 4,872,014 | 10/1989 | Noworgrodzki | 342/351 |
| 4,888,591 | 12/1989 | Landt et al. | 342/44 |
| 4,899,158 | 2/1990 | Saeki et al. | 342/44 |
| 4,908,627 | 3/1990 | Santos | 342/125 |
| 4,926,182 | 5/1990 | Ohta et al. | 342/44 |
| 4,963,887 | 10/1990 | Kawashima et al. | 342/44 |

*Primary Examiner*—John B. Sotomayor

[57] ABSTRACT

A covert radar response system suitable for use with an illuminating coherent radar system having a moving target indicator subsystem shifts the phase and/or frequency of a retroreflected beam to transmit a message to the illuminating system that is not detectable by other observers in the vicinity.

8 Claims, 2 Drawing Sheets

RADAR RESPONSE SYSTEM

TECHNICAL FIELD

The field of the invention is that of radar signal processing for coherent radar systems.

BACKGROUND ART

In the field of radar, in general, and the subfield of responding to an interrogating signal, it has been known in the past to modulate the amplitude of an incident radar beam and to direct the modulated beam back to the transmitter. For example, IFF systems sometimes use rotating propellers that send a chopped signal back to the transmitting platform. Such systems have the drawback that the return signal may be observed by other observers in the vicinity, since the amplitude modulation is noticeable off the line of sight between the illuminating radar and the target.

It would be advantageous if a target could return a covert response that would not be observable by any system other than the illuminating radar.

DISCLOSURE OF INVENTION

The invention relates to a radar responding system, which may be passive or active, and in which the phase and/or frequency of a coherent illuminating beam is modified and the modified beam is directed back at the illuminating platform. It is an advantageous feature of the invention that, for phase shifts and for slight frequency variations, other observers in the vicinity will not be able to tell that a message has been transmitted. They will be able to observe that energy has been reflected back to the illuminating system but will not be able, in the case of a coherent illuminating beam, to know that a message has been sent or the contents of the message Other features and advantages will be apparent from the specification and claims and from the accompanying drawings which illustrate an embodiment of the invention.

BEST MODE FOR CARRYING OUT THE INVENTION

Figure 1:
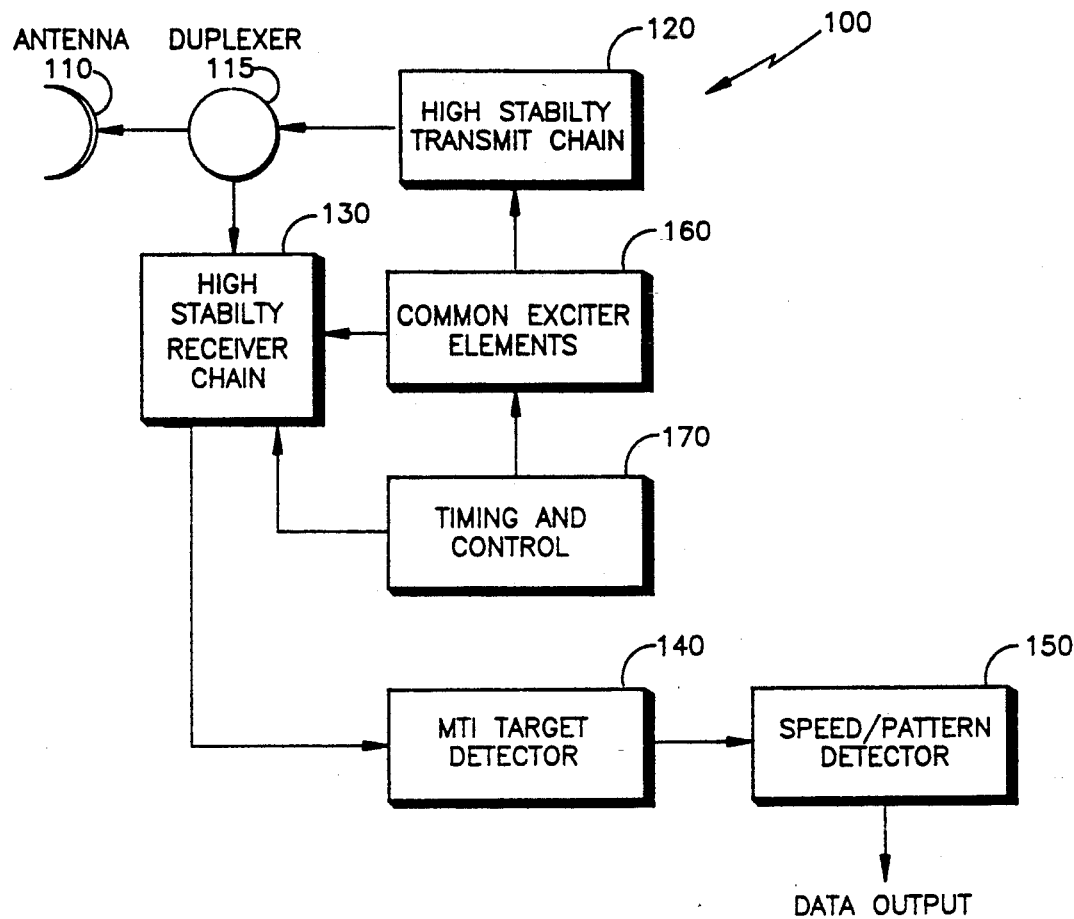
FIG. 1 illustrates schematically a coherent radar system suitable for use with the system.

Referring now to FIG. 1, there is shown in block diagram form a stable coherent radar system suitable for use on an aircraft that has an MTI (moving target indicator) feature. Such a radar is, for example, the multimode RADAR manufactured by Norden Systems, Inc. of Norwalk, Conn.

The MTI indication comes from the receiver and will be, for example, a doppler shift or an equivalent phase or frequency shift that indicates the speed of the target relative to the aircraft. For typical land based targets moving on the order of 10 kilometers per hour, the doppler shift in question is so small that another observer in the vicinity would not be able to detect the frequency shift, since he does not have access to the stable reference circuit within the transmitter system. Conventional signal processing is done in the speed pattern detector unit 150, which produces an output such as target moving at X miles per hour for Y seconds. This feature of the system provides an opportunity for a built-in coding. The return signal is some arbitrary pattern of speed and duration that will be confused with actual target return signals.

Figure 2:
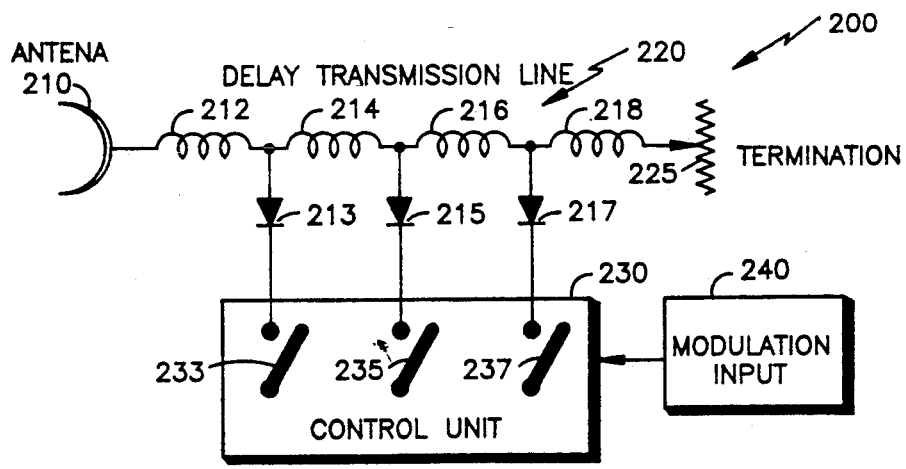
FIG. 2 illustrates schematically one embodiment of a responding system according to the invention.

Referring now to FIG. 2, there is shown a schematic version of a passive responder system suitable for use with the invention. Antenna 210 picks up the incoming signal. The converted power travels through transmission line 220, reflects off terminator 225, a conventional unit known to those skilled in the art, back out antenna 210. Transmission line 220 consists of a number of impedances 212, 214, 216 connected by diodes 213, 215 and 217, which are activated by switches 233, 235, and 237 under control of control unit 230. By selectively picking one or more switch to be closed, a variable phase shift can be imposed on the return signal.

A modulation input signal coming from unit 240 enters control unit 230 to impose one of a predetermined set of return patterns by varying the number of switches closed. These patterns may be chosen to represent symbolically any relevant message.

Those skilled in the art will readily be able to devise any of a number of other return units. For example, the variable phase reflector illustrated in copending U.S. patent Ser. No. 138,775, may be used with this invention, though it will probably be more expensive than the embodiment illustrated.

Figure 3:
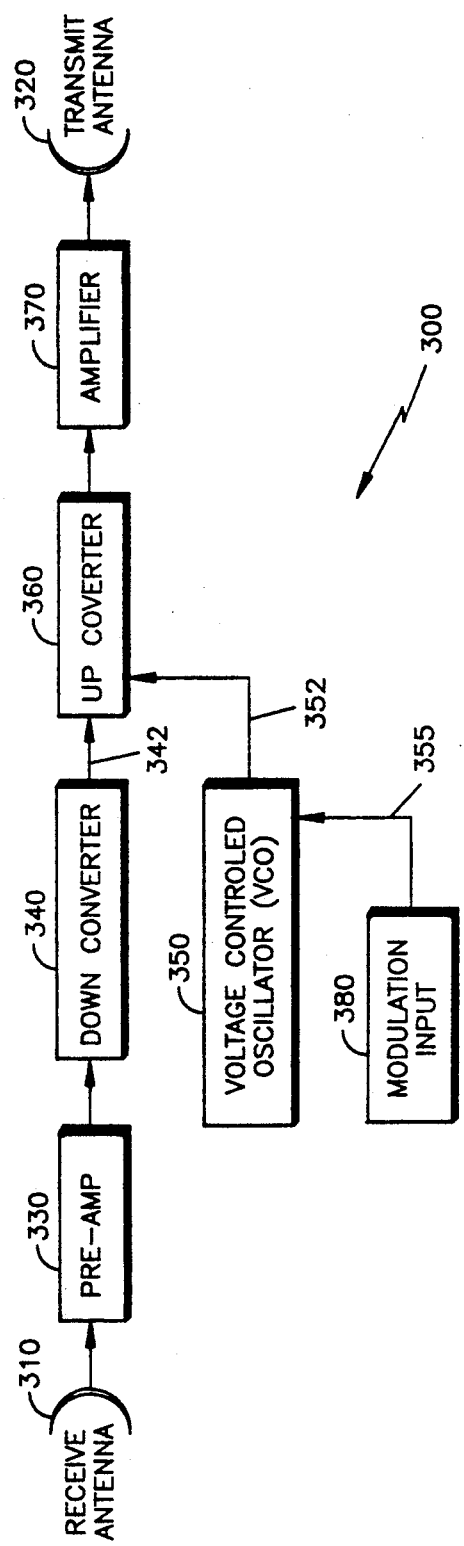
FIG. 3 illustrates an alternative embodiment of a responding system.

Similarly, a predetermined frequency shift may be imposed on the return signal using the system shown in FIG. 3, in which an incoming signal on receiving antenna 310 is amplified in preamp 330, down-converted in unit 340 and sent on line 342 to upconverter 360. Any convenient modulation signal is sent on line 355 to voltage controlled oscillator 350, the output of which is sent on line 352 to upconverter 360. The two signals are mixed in unit 360 and the result is passed to amplifier 370, which, in turn, passes the amplified signal to transmitting antenna 320.

With this arrangement, a set of coded responses or any other source of signals, such as a computer with a keyboard, may be stored or generated in controlling unit 380. For example, unit 380 may be a teletype or personal computer and the modulation input on line 355 may be a set of codes corresponding to the alphabet.

It should be understood that the invention is not limited to the particular embodiments shown and described herein, but that various changes and modifications may be made without departing from the spirit and scope of this novel concept as defined by the following claims.

What is claimed is:

1. A radar system comprising an antenna;
   a transmit chain of elements connected to said antenna;
   a receiver chain of elements connected to said antenna for detecting a radar return signal having a return amplitude, return phase and return frequency;
   timing and control means for directing power to said antenna and for receiving signals collected by said antenna;
   an MTI target detector connected to said receiver chain for detecting frequency and/or phase shifts in a return signal returned by a target; and
   a speed/pattern indicator connected to said MTI target indicator for processing signals therefrom to extract information representing the speed of said target, characterized in that:

said speed/pattern indicator includes means for recognizing a predetermined speed/pattern signal representing a message sent from said target, whereby said target may communicate with said radar system by means of modulation of the phase or frequency of a radar target return to impress thereon a predetermined pattern representing a message, without substantially patterning said amplitude of said radar target return.

2. A system according to claim 1, further characterized in that said means for recognizing a pattern includes phase means for detecting modulations in phase of said radar target return.

3. A system according to claim 1, further characterized in that said means for recognizing a pattern includes frequency means for detecting modulations in frequency of said radar target return.

4. A system for responding to an interrogating radar signal having an input phase, input amplitude envelope, and input frequency comprising an antenna;

means for modulating said interrogating signal to generate a return radar signal differing from said interrogating radar signal in a pattern of phase shifts relative to said input phase, but having said input frequency and input amplitude envelope, and means for directing said return radar signal to said antenna, whereby said interrogating radar signal is returned with said predetermined pattern of phase shifts.

5. A system according to claim 4, in which said means for modulating said interrogating radar signal comprises controllable impedance means for imposing a controllable phase shift on said interrogating radar signal and reflecting means for reflecting received interrogating power back through said antenna.

6. A system for responding to an input radar signal having an input phase input and amplitude envelope and input frequency comprising a first antenna pointing in a predetermined direction;

means for modulating said input radar signal to generate a return radar signal having substantially said input amplitude envelope in a reflected return radar signal, but differing from said input radar signal in a pattern of frequency shifts relative to said input frequency, and means for directing said return radar signal to a second antenna pointing in said predetermined direction whereby said system responds with a return radar signal substantially the same as a reflected return signal, but differing from a reflected return signal by said pattern of frequency shifts.

7. A system according to claim 6, in which said means for modulating said interrogating radar signal comprises means for generating a predetermined pattern of intermediate frequency signals and combining said intermediate signals with said interrogating radar signal to generate a radar return signal related to said interrogating radar signal and to said intermediate signals.

8. A system for responding to an interrogating radar signal having an input phase, input amplitude envelope, and input frequency comprising an antenna;

passive means for modulating said interrogating signal to generate a return radar signal differing from said interrogating radar signal in a pattern of phase shifts relative to said input phase, but having said input frequency and input amplitude envelope, and means for directing said return radar signal to said antenna, whereby said interrogating radar signal is returned with said predetermined pattern of phase shifts.

* * * * *